(12) United States Patent
Sempel et al.

(10) Patent No.: US 9,755,435 B2
(45) Date of Patent: Sep. 5, 2017

(54) WIRELESS POWER CONVERTER UTILIZED AS A CAPACITIVE POWER TRANSFER SYSTEM

(75) Inventors: Adrianus Sempel, Waalre (NL); Henricus Theodorus Van Der Zanden, Sint-Oedenrode (NL); Eberhard Waffenschmidt, Aachen (DE); Dave Willem Van Goor, Nederweert (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 673 days.

(21) Appl. No.: 14/237,472

(22) PCT Filed: Jul. 31, 2012

(86) PCT No.: PCT/IB2012/053902
§ 371 (c)(1),
(2), (4) Date: Feb. 6, 2014

(87) PCT Pub. No.: WO2013/024385
PCT Pub. Date: Feb. 21, 2013

(65) Prior Publication Data
US 2014/0183973 A1    Jul. 3, 2014

Related U.S. Application Data

(60) Provisional application No. 61/523,924, filed on Aug. 16, 2011, provisional application No. 61/647,744, filed on May 16, 2012.

(51) Int. Cl.
*H02J 50/05* (2016.01)
*H02J 5/00* (2016.01)
(Continued)

(52) U.S. Cl.
CPC ............. *H02J 5/00* (2013.01); *H02J 1/06* (2013.01); *H02J 5/005* (2013.01); *H02J 17/00* (2013.01);
(Continued)

(58) Field of Classification Search
CPC ........................................... H02J 50/05
See application file for complete search history.

(56) References Cited

U.S. PATENT DOCUMENTS 6,459,175 B1  10/2002  Potega
6,490,176 B2  12/2002  Holzer et al.
(Continued)

FOREIGN PATENT DOCUMENTS

JP    2009089520 A  *  4/2009
JP    2010213554 A  *  9/2010
(Continued)

OTHER PUBLICATIONS

English machine translation of JP 2010213554 A, published Sep. 24, 2010.*

*Primary Examiner* — Rexford Barnie
*Assistant Examiner* — David Shiao

(57) ABSTRACT

A direct current (DC) to alternating current (AC) wireless converter apparatus (200) for supplying power to a load connected in a capacitive power transfer system. The apparatus comprises at least two connectors (201, 202) enabling a galvanic contact to at least two supply lines (211, 212) of a DC grid; a driver (203) coupled to the connectors (201, 202) and configured to generate an AC power signal from an input DC signal fed by the at least two connectors, wherein a frequency of the AC power signal substantially matches a series-resonance frequency of the capacitive power transfer system; and at least a pair of transmitter electrodes (204, 205) connected to an output of the driver.

7 Claims, 4 Drawing Sheets

(51) Int. Cl.
*H02J 1/06* (2006.01)
*H02J 17/00* (2006.01)
*H02J 1/00* (2006.01)

(52) U.S. Cl.
CPC ......... *H02J 50/05* (2016.02); *H02J 2001/002* (2013.01)

(56) References Cited

U.S. PATENT DOCUMENTS

| | | |
|---|---|---|
| 6,987,670 B2 | 1/2006 | Ahmed et al. |
| 7,039,821 B1 | 5/2006 | Potega |
| 2007/0072474 A1 | 3/2007 | Beasley et al. |
| 2008/0076351 A1* | 3/2008 | Washiro ............... H04B 5/0031 455/41.1 |
| 2009/0159677 A1* | 6/2009 | Yakimov ............ H05B 33/0896 235/439 |
| 2009/0161317 A1 | 6/2009 | Hussaini et al. |
| 2009/0302690 A1* | 12/2009 | Kubono .................. H02J 17/00 307/109 |
| 2010/0264747 A1 | 10/2010 | Hall et al. |
| 2012/0062174 A1* | 3/2012 | Kamata ................... H02J 7/025 320/108 |
| 2012/0091818 A1 | 4/2012 | Wesemann et al. |

FOREIGN PATENT DOCUMENTS

| | | |
|---|---|---|
| WO | 2010095448 A1 | 8/2010 |
| WO | 2010103787 A1 | 9/2010 |

\* cited by examiner

WIRELESS POWER CONVERTER UTILIZED AS A CAPACITIVE POWER TRANSFER SYSTEM

This application claims the benefit of U.S. provisional patent application No. 61/523,924 filed on Aug. 16, 2011 and U.S. provisional patent application No. 61/647,744 filed on May 16, 2012.

The invention generally relates to capacitive power transfer systems, and more particularly to the connectivity of such systems to a DC power grid.

A wireless power transfer refers to the supply of electrical power without any wires or contacts, whereby the powering of electronic devices is performed through a wireless medium. One popular application for contactless powering is for the charging of portable electronic devices, e.g., mobiles phones, laptop computers, and the like.

One implementation for wireless power transfers is by an inductive powering system. In such a system, the electromagnetic inductance between a power source (transmitter) and the device (receiver) allows for contactless power transfers. Both the transmitter and receiver are fitted with electrical coils, and when brought into physical proximity, an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of an inductance to resistance, be composed of materials with low resistance, and fabricated using a Litz-wire process to reduce skin-effect. Moreover, the coils should be designed to meet complicated geometries to avoid Eddy-currents. Therefore, expensive coils are required for efficient inductive powering systems. A design for a contactless power transfer system for large areas would necessitate many expensive coils, whereby for such applications an inductive powering system may not be feasible.

Capacitive coupling is another technique for transferring power wirelessly. This technique is predominantly utilized in data transfer and sensing applications. A car-radio antenna glued on the window with a pick-up element inside the car is an example of a capacitive coupling. The capacitive coupling technique is also utilized for contactless charging of electronic devices. For such applications, the charging unit (implementing the capacitive coupling) operates at frequencies outside the inherent resonance frequency of the device. In the related art, a capacitive power transfer circuit that enables LED lighting is also discussed. The circuit is based on an inductor in the power source (driver). As such, only a single receiver can be used and the transmitter frequency should be tuned to transfer the maximum power. In addition, such a circuit requires pixelated electrodes, which ensure power transfer between the receiver and transmitter even when they are not perfectly aligned. However, increasing the number of the pixelated electrodes increases the number of connections to the electrodes, thereby increasing the power loss. Thus, when having only a single receiver and limited size electrodes, the capacitive power transfer circuit discussed in the related art cannot supply power over a large area, e.g., windows, walls, and so on.

Recently more and more residential and commercial buildings include direct current (DC) power grids. Such DC power grids may also be utilized to transfer power to towns. As an example, a DC power grid in China covers over 1400 km for transportation of hydro generated electricity. In buildings, one or more rectifiers are typically installed in a building's service entrance to provide DC power through a separate, or even in some cases over existing, alternating current (AC) power lines. The DC power can be utilized to power lighting fixtures, such as commercial fluorescent lighting. The advantages of using DC grids are low cost of the power transportation, better utility of copper transmission lines, and low AC radiation.

Thus, there is a challenge to provide an efficient capacitive power transfer system for supplying power over large surfaces. In addition, there is a challenge of supplying the power to the capacitive power system from a DC grid from any arbitrary position. Therefore, it would be advantageous to provide a low cost and feasible solution that would address these challenges.

Certain embodiments disclosed herein include a direct current (DC) to alternating current (AC) wireless converter apparatus for supplying power to a load connected in a capacitive power transfer system. The apparatus comprises at least two connectors enabling a galvanic contact to at least two supply lines of a DC grid; a driver coupled to the connectors and configured to generate an AC power signal from an input DC signal fed by the at least two connectors, wherein a frequency of the AC power signal substantially matches a series-resonance frequency of the capacitive power transfer system; and at least a pair of transmitter electrodes connected to an output of the driver.

Certain embodiments disclosed herein also include an alternating current (AC) to direct current (DC) wireless converter apparatus for locally supplying DC signals to a non-powered DC grid connected to a capacitive power transfer system. The system comprises at least a pair of electrodes being capacitive coupled to at least two electrodes of an AC power grid, thereby enabling an AC power signal to be wirelessly transferred from the AC power grid to the at least pair of electrodes; an AC-to-DC converter connected to the at least pair of electrodes and configured to generate a DC signal from the AC power signal; and at least two connectors enabling a galvanic contact to at least two supply lines of the non-powered DC grid.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
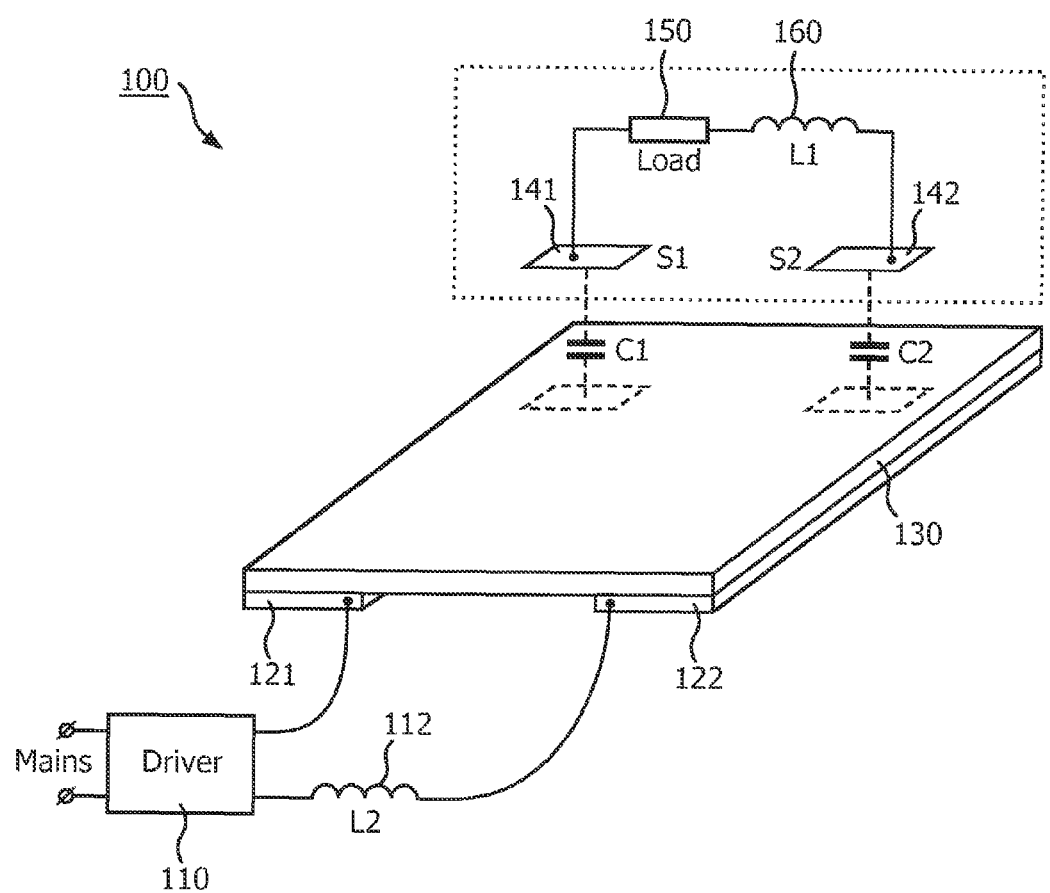
FIG. 1 is a diagram of a capacitive power transfer system that can be utilized by the disclosed apparatus.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a capacitive powering system 100 that can be utilized for wireless power transfer according to one embodiment. The system 100 enables large area power transmissions. The system 100 can be installed in places where open electrical contacts are not preferred or not desirable, such as bathrooms, retail-shops where regular variations are needed to illuminate a product, furniture, and the like. The system 100 can transfer power over a large area, and thus can be utilized to power devices mounted on walls, windows, mirrors, floors, seats, aisles, and so on.

The system 100 includes a power driver 110 connected to a pair of transmitter electrodes 121, 122 which are attached to an insulating layer 130. The system 100 also includes a pair of receiver electrodes 141, 142 connected to a load 150 and an inductor 160. Optionally, the system 100 may include an inductor 112 coupled to the driver 110.

The connection between the transmitter electrodes 121, 122 to the driver 110 is by means of a galvanic contact or a capacitive in-coupling. A power signal is supplied to the load 150 by placing the receiver electrodes 141, 142 in proximity to the transmitter electrodes 121, 122 without having a direct contact between the two. Thus, no mechanical connector or any electrical contact is required in order to power the load 150. The load 150 may be, but is not limited to, lighting elements (e.g., LED, LED string, a lamp, etc.), organic light emitting diode (OLED) surfaces, displays, computers, power charges, loudspeakers, and the like.

The driver 110 outputs an AC voltage signal having a frequency that substantially matches the series-resonance frequency of a circuit consisting of a series of capacitors and inductors 112, 160. The capacitors (labeled as C1 and C2 in FIG. 1) are the capacitive impedance formed between the transmitter electrodes 121, 122 (shown in dotted lines in FIG. 1) and receiver electrodes 141, 142. The impedances of the capacitors and inductor(s) 112 and/or 160 cancel each other at the resonance frequency, resulting in a low-ohmic circuit. Thus, the system 100 is capable of delivering power to the load 150 with very low power loss.

The driver 110 generates an AC signal of which amplitude, frequency, and waveform can be controlled. The output signal typically has an amplitude of tens of volts and a frequency of up to a few Mega Hertz (MHz). Frequency tuning between the generated signal and series-resonance can be performed by changing the frequency, phase, or duty cycle of the signal output by the driver 110. Alternatively, the frequency tuning can be achieved by changing the capacitance or inductive values of the circuit connected to the driver 110.

The insulating layer 130 is a thin layer substrate material that can be of any insulating material, including for example, air, paper, wood, textile, glass, DI-water, and so on. Preferably, a material with dielectric permittivity is selected. The thickness of the insulating layer 130 is typically between 10 microns (e.g., a paint layer) and a few millimeters (e.g., a glass layer).

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. In another embodiment, the transmitter electrodes 121, 122 can be placed on opposite sides of the insulating layer 130. The transmitter electrodes 121, 122 can be any shape including, for example, a rectangle, a circle, a square, or combinations thereof. The conductive material of the each of the transmitter electrodes may be, for example, carbon, aluminum, indium tin oxide (ITO), organic material, such as Poly(3,4-ethylenedioxythiophene (PEDOT), copper, silver, conducting paint, or any conductive material. The receiver electrodes 141, 142 can be of the same conductive material as the transmitter electrodes 121, 122 or made of different conductive material.

The total capacitance of the system 100 is formed by the overlap areas of the respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This element may be in a form of one or more inductors that are part of the transmitter electrodes or the receiver electrodes, distributed over the driver 110 and the load 150 (e.g., inductors 160 and 112 shown in FIG. 1), inductors incorporated within insulating layer 130, or any combination thereof.

The load 150 allows for an AC bi-directional current flow. The load 150 may include a diode or an AC/DC converter to locally generate a DC voltage. The load 150 may further include electronics for controlling or programming various functions of the load 150 based on a control signal generated by the driver 110.

The capacitive powering system 100, as exemplarily illustrated in FIG. 1, depicts a single load 150 that is powered by the driver 110. However, it should be noted that the driver 110 can also power multiple loads, each of which may be tuned to a different operational frequency. Alternatively, the multiple loads may be tuned to the same operation frequency.

Figure 2:
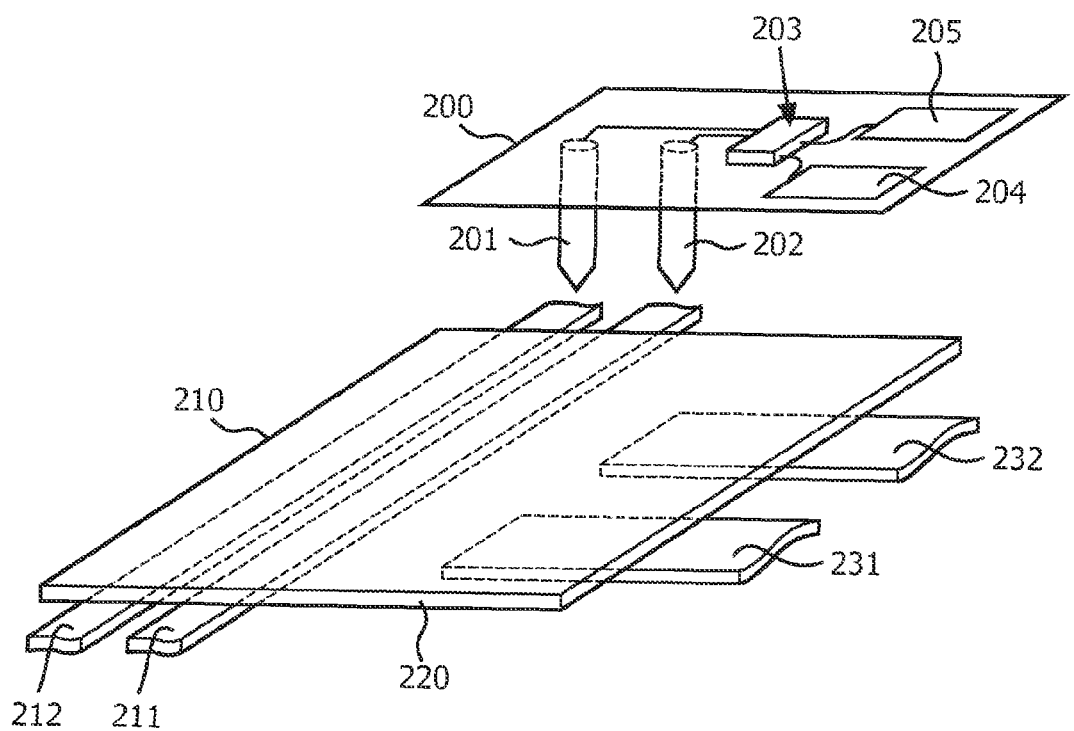
FIG. 2 is a block diagram of a DC-to-AC wireless converter apparatus designed according to one embodiment.

According to various embodiments disclosed herein an apparatus that enables the local connection of the capacitive powering system to a DC grid is provided. FIG. 2 shows an exemplary and non-limiting diagram of an apparatus 200 designed according to one embodiment and utilized to locally connect the system to the DC grid.

The apparatus 200 is a capacitive power converter that includes at least a pair of connectors 201, 202, a driver 203, and a pair of transmitter electrodes 204, 205 coupled to the driver 203. The components of the apparatus 200 are assembled on a surface that can be made of conductive or non-conductive material.

The connectors 201, 202 allow a galvanic contact to a pair of power supply lines 211, 212 of a DC grid included in an infrastructure 210. In an embodiment, the connectors 201, 202 are two conductive pins that can be punched through an insulating layer 220 to make an electrical contact with the supply lines 211, 212. The connectors 201, 202 can also provide the mechanical means to fix the apparatus 200 to the DC grid infrastructure 210. In certain embodiments, the apparatus 200 can be mounted on the DC grid infrastructure 210 using mechanical means including, for example and without limitation, screws (non-conducting or in electrically insulated holes), glue, magnets, or fabric application (e.g., Velcro®-tape).

The driver 203 generates AC signals from the input DC current that flows from the supply lines 211, 212. The amplitude, frequency, and waveform of the generated AC signals are selected in such a way as to efficiently power a load (not shown in FIG. 2) connected to a pair of receiver electrodes 231, 232. Specifically, the frequency of the AC signal substantially matches a series-resonance frequency of the capacitive powering system. As mentioned above, the series-resonance frequency is a function of the inductive value of the inductor, the capacitive impedance formed between the pair of transmitter electrodes 204, 205 and receiver electrodes 231, 232, and the characteristic of the insulating layer 220. In the arrangement illustrated in FIG. 3, the inductive element of the capacitive powering system can be connected to the load and/or may be part of the apparatus 200 (connected between the driver 203 and one of the transmitter electrodes 204, 205). Various embodiments to implement the driver 203 are discussed in detail below.

Returning to FIG. 2, when the apparatus 200 is connected to the DC grid infrastructure 210 a complete capacitive powering system is formed including the driver 203, the transmitter electrodes 204, 205, the insulating layer 220, and the receiver electrodes 231, 232. Although not shown in FIG. 2, a load is connected to the receiver electrodes 231, 232 and an inductive element. Thus, when an electrical contact is made between the connectors 201, 202 and the supply lines 211, 212, AC power signals generated by the driver 203 are wirelessly transferred to receiver electrodes 231, 232 to power the load connected thereto.

Figure 3:
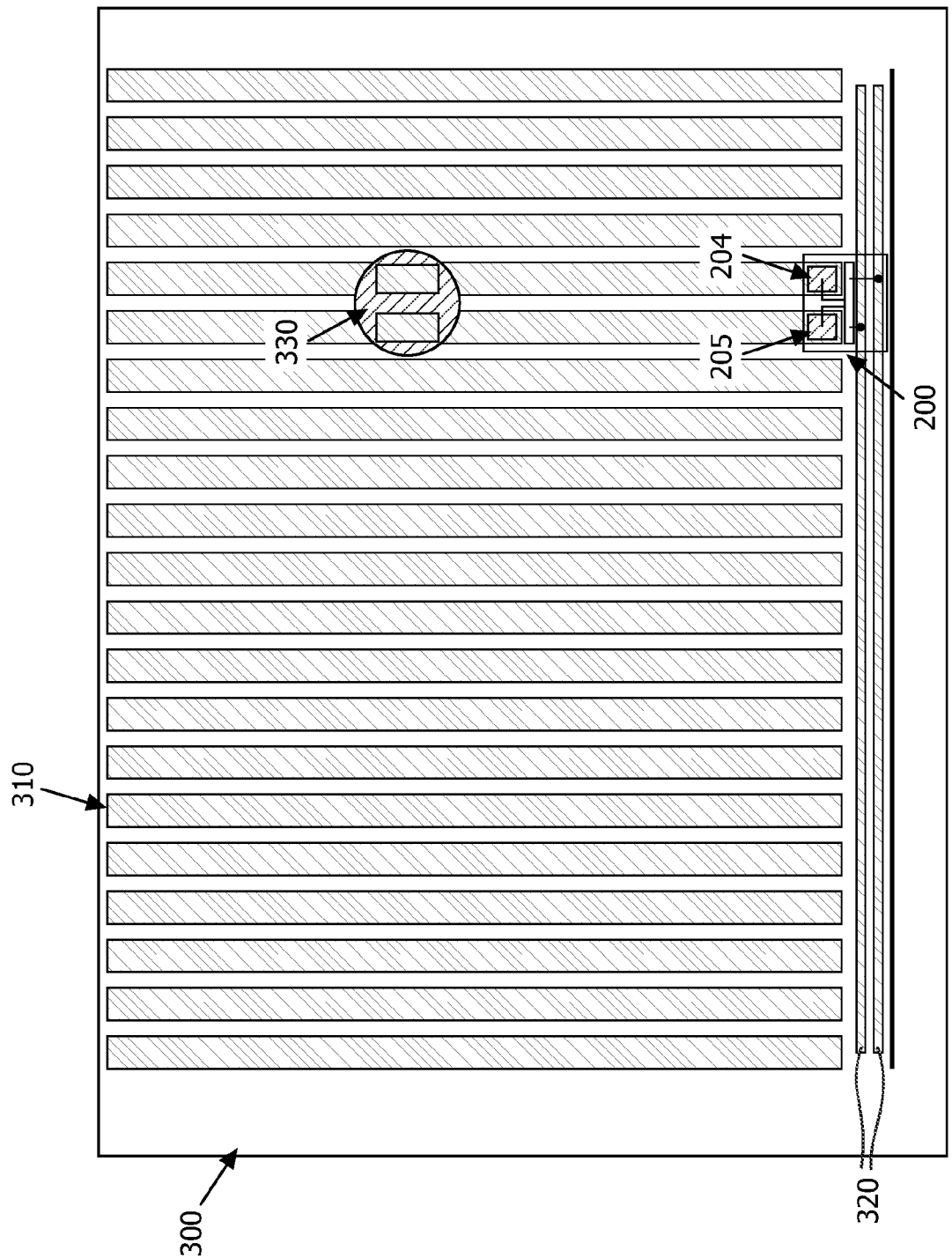
FIG. 3 is a diagram showing an exemplary connection of the DC-to-AC wireless converter apparatus to an infrastructure.

The supply lines 211, 212 of the DC grid typically run through rooms and floors of a building. The DC grid infrastructure 210 may be a large surface, such as a wall, a window, a ceiling, and the like. The embodiments disclosed herein allow connecting the receiver (including the load and electrodes) remotely from the supply lines 211, 212 and the apparatus 200. That is, the receiver may be connected at any arbitrary position on the DC grid infrastructure 210. FIG. 3 is a non-limiting and exemplary diagram illustrating such a connection.

The infrastructure, depicted in FIG. 3 may be, for example, a wall, a ceiling, a window, furniture, an exhibition area, and the like. The infrastructure 300 is covered with vertical conductive stripes 310; each pair of the conductive stripes serves as the receiver electrodes 231, 232, discussed with respect to FIG. 2. In one embodiment, the conductive stripes 310 are placed on the back side of the non-conductive material that forms the insulating layer 220. Such non-conductive material may be, for example, wall paper material, a paint layer, and so on. The conductive stripes 310 may be made of, for example, conducting ink, conducting paint, and the like.

The infrastructure 300 also includes at least a pair of horizontal conductive stripes 320 serving as the DC grid supply lines 211, 212, discussed with respect to FIG. 2. The apparatus 200 of FIG. 2 is connected to the horizontal conductive stripes 320 by means of a galvanic contact, in such a way that the transmitter electrodes 204, 205 of the apparatus 200 overlap the pair of stripes 310 to which a load 330 is connected. The AC power signals generated by the driver 203 of the apparatus 200 is transferred to the pair of stripes 310 by means of capacitive coupling as discussed in detail above.

The load 330 can be connected to any pair of vertical conductive stripes 310 at any location along the two stripes. In one embodiment, the load 330 may be any lighting element including, for example, LED, a LED string, a lamp, organic light emitting diode (OLED) surfaces, and the like. The load 330 is mounted on the infrastructure 300 using a fixing means including, for example, screws (non-conducting or in electrically insulated holes), glue, magnets, or fabric application (e.g., Velcro®-tape). It should be noted that there is no direct electrical contact between the supply lines 211, 212, the transmitter electrodes 204, 205 of the apparatus 200 and the load 330. The load 330 is powered through a pair of the conductive stripes 310.

When changing the location of the load 330, the apparatus 200 can be simply placed in such a way that the transmitter electrodes 204, 205 overlap the new pair of vertical conductive stripes 310 to which the load 330 is connected.

It should be noted that although not illustrated in FIG. 3, the load 330 may be connected to an inductive element to resonate the capacitive power system. Alternatively or collectively, the inductive element may be connected to the driver 203 of the apparatus 200. It should be further noted that multiple loads can be mounted on the infrastructure 300, each of which is powered by an apparatus 200 as discussed above. In one embodiment, one apparatus 200 can be utilized to power a plurality of loads. Accordingly, in one embodiment the number of transmitter electrodes of the apparatus 200 is at least twice the number of loads to be powered.

In various embodiments, the horizontal and conductive vertical stripes may be constructed within one layer on the infrastructure 300 or within different layers of the infrastructure 300. For example, when constructed in different layers, the vertical (AC) conductive stripes are placed within wallpaper and the horizontal (DC) conductive stripes are formed as a separate sandwich on top of the wallpaper or mounted within or on top of the base board. Further, the DC conductive stripes may be placed in the horizontal direction, while the AC conductive stripes may be placed in the vertical direction. It should be noted that the AC and DC conductive stripes may be formed using different shapes. In one embodiment, the DC conductive stripes may be glued on top of the wallpaper.

Figure 4:
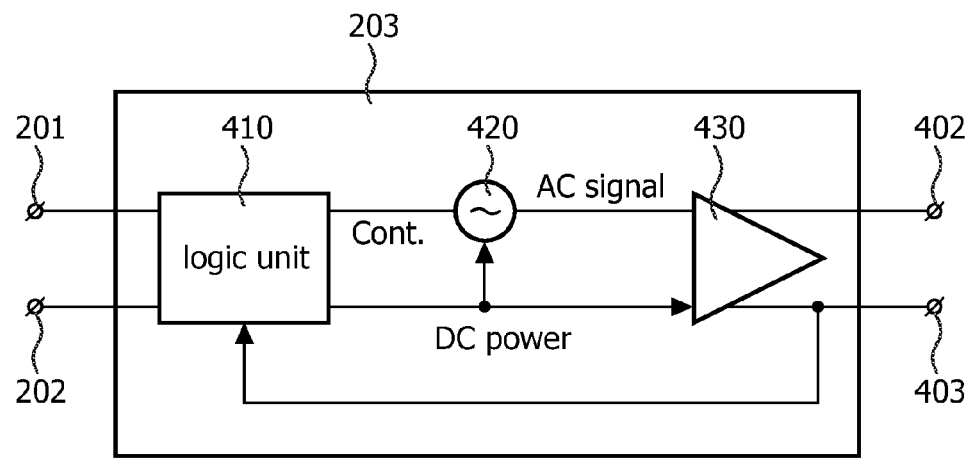
FIG. 4 is a block diagram of a driver constructed to generate both low and high power AC signals.

FIG. 4 shows a non-limiting and exemplary block diagram of the driver 203 according to one embodiment. The driver 203 is constructed to generate and output the power AC signals having amplitude and frequency enabled to power the load.

The driver 203 includes a logic unit 410, an oscillator 420, and an amplifier 430. The DC signals from the DC grid are input to the logic unit 410. The logic unit 410 is configured, in part, to interchange the polarity of the input DC signal and to generate a frequency control being fed to the oscillator 420. The logic unit 410 also adjusts the input DC signal to a voltage level required for the operation of the oscillator 420 and amplifier 430.

The oscillator 420 generates an AC signal at the resonant frequency of the capacitive powering system based on the frequency control signal generated by the logic unit 410. The output of the oscillator 420 is fed to the amplifier 430 which amplifies the AC signal to a power level required to power the load. The amplifier 430 may be controlled by the logic unit 410 to generate a signal at the required power level. The amplifier 430 may be, but is not limited to, a linear amplifier, an H-bridge amplifier, a switch mode amplifier, and the like.

In one embodiment the logic unit 410 senses the phase of the voltage and current at the outputs 402, 403 to determine if tuning of the signal is required. Alternatively or collectively, the phase of the voltage and current are measured in the receiver electrodes. In another embodiment, the driver 203 generates a control signal that is modulated on the AC power signal, such as a control signal that can be utilized to control the load. For example, if the load is an LED lamp, a control signal output by the driver 203 may be utilized for dimming or color setting of the LED lamp.

It should be noted that the tuning of the AC power signal is performed in order to maximize the current flows through the load. As mentioned above, this is achieved when the series-resonance frequency of the system and the output AC signal frequency match each other.

Figure 5:
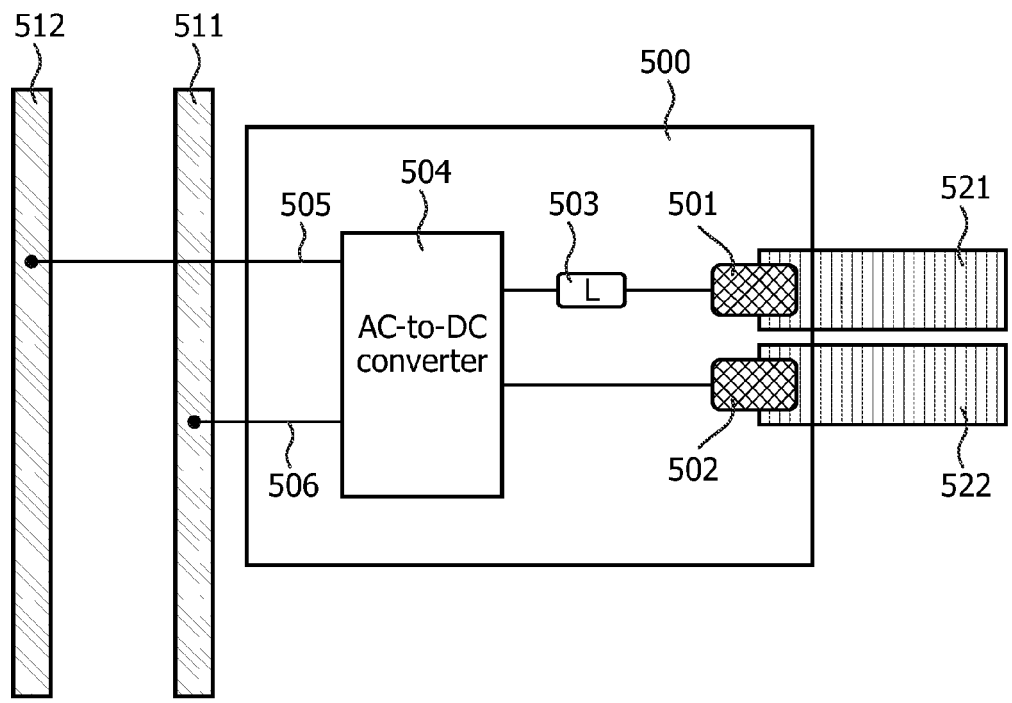
FIG. 5 is a block diagram of an AC-to-DC wireless converter apparatus according to an embodiment.

FIG. 5 shows a non-limiting diagram of a wireless AC to DC power converter apparatus 500 according to an embodiment of the invention. The apparatus 500 includes a pair of electrodes 501, 502 through which AC power signals from conductive stripes 521, 522 of an AC power grid are wirelessly received. An insulating layer (not shown in FIG. 5) insulates between the pair of electrodes 501, 502 and the conductive stripes 521, 522 of the AC power grid, wherein the insulating layer is made of a non-conductive material. The AC power signals are transferred by means of capacitive coupling as discussed in detail above. The apparatus 500 also includes an inductive element 503 to resonate the apparatus 500 at a frequency that substantially matches the frequency of the AC signals supplied by the AC grid.

The input AC signals are converted to DC signals by the converter 504. The converter 504, in one embodiment, is implemented as a rectifier. The DC signals output by the converter 504 may be supplied to non-powered conductive stripes 511, 512 using a pair of connectors 505, 506. The connection between the connectors 505, 506 and the conductive stripes 511, 512 of the DC grid is by means of a galvanic contact. The conductive stripes 511, 512 when supplied with DC signals, form a local DC grid. The conductive stripes 511, 512 can be made arbitrarily long without producing AC radiation. The apparatus 500 can be placed everywhere on an AC grid to activate a local DC grid.

In another embodiment, a system that includes the wireless DC-to-AC power converter apparatus 200 and the wireless AC-to-DC power converter apparatus 500 is provided. Such a system may also include a controller that activates one of the converters depending on the source of the input power, i.e., either AC or DC power signals.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A direct current (DC) to alternating current (AC) wireless converter apparatus for locally connecting a capacitive power transfer system to a DC grid and supplying power to a load connected in the capacitive power transfer system, comprising:
    at least two connectors enabling a galvanic contact to at least two supply lines of a DC grid;
    a driver coupled to the connectors and configured to generate an AC power signal from an input DC signal fed by the at least two connectors; and
    at least a pair of transmitter electrodes connected to an output of the driver, wherein the components of the DC to AC wireless converter apparatus are assembled on a surface of at least one layer, the at least one layer including a pair of receiver electrodes and the two supply lines of the DC grid, such that the at least two connectors extend into the at least one layer to contact the at least two supply lines and the at least a pair of transmitter electrodes overlap with and transmit the AC power signal to the pair of receiver electrodes,
    wherein a frequency of the AC power signal substantially matches a series-resonance frequency of a series-resonance circuit including a capacitive impedance formed between the at least a pair of transmitter electrodes and the pair of receiver electrodes.

2. The apparatus of claim 1, further comprising an inductor connected in series between the driver and one of the at least a pair of transmitter electrodes.

3. The apparatus of claim 2, wherein the series-resonance circuit further includes the inductive impedance of the inductor.

4. The apparatus of claim 1, wherein the pair of receiver electrodes are horizontal conductive stripes and the supply lines are vertical conductive stripes included on a same layer of the at least one layer.

5. The apparatus of claim 1, wherein the pair of receiver electrodes are horizontal conductive stripes and the supply lines are vertical conductive stripes included on different layers of the at least one layer.

6. The apparatus of claim 1, wherein the driver comprises:
    a logic unit configured to interchange a polarity of the input DC signal and to generate a frequency control signal;
    an oscillator configured to generate an AC signal at the series-resonance frequency based on the generated frequency control signal; and
    an amplifier configured to amplify the AC signal generated by the oscillator to an amplitude required to power a load connected to the pair of receiver electrodes.

7. The apparatus of claim 6, wherein the logic unit is further configured to control the operation of the load.

* * * * *